(12) United States Patent
Boyd et al.

(10) Patent No.: US 11,788,826 B2
(45) Date of Patent: *Oct. 17, 2023

(54) METHODS AND SYSTEMS FOR AN IN-LINE AUTOMATED INSPECTION OF A MECHANICAL PART

(71) Applicant: PROTOLABS, INC., Maple Plain, MN (US)

(72) Inventors: Eric M. Boyd, Plymouth, MN (US); Dylan Lundberg, Otsego, MN (US); Michael Bruce Laughton, Eden Prairie, MN (US); Nicholas John Griffin, Elk River, MN (US)

(73) Assignee: PROTOLABS, INC., Maple Plain, MN (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/497,575

(22) Filed: Oct. 8, 2021

(65) Prior Publication Data

US 2022/0026191 A1    Jan. 27, 2022

Related U.S. Application Data

(63) Continuation of application No. 16/803,341, filed on Feb. 27, 2020, now Pat. No. 11,162,770.

(51) Int. Cl.
*G01B 5/012* (2006.01)
*G05B 19/418* (2006.01)
*G01B 5/00* (2006.01)

(52) U.S. Cl.
CPC .......... *G01B 5/012* (2013.01); *G01B 5/0004* (2013.01); *G05B 19/41885* (2013.01)

(58) Field of Classification Search
None
See application file for complete search history.

(56) References Cited

U.S. PATENT DOCUMENTS

| 6,668,466 | B1 * | 12/2003 | Bieg | G01B 5/008 |
| | | | | 33/503 |
| 6,879,933 | B2 * | 4/2005 | Steffey | G01B 21/04 |
| | | | | 702/155 |

(Continued)

FOREIGN PATENT DOCUMENTS

DE    102012104563 A1 *  11/2012    ............. G01B 11/02

*Primary Examiner* — Christopher W Fulton
(74) *Attorney, Agent, or Firm* — CALDWELL INTELLECTUAL PROPERTY LAW

(57) ABSTRACT

A method of in-line automated inspection of a mechanical part comprising receiving a mechanical part datum, orienting the mechanical part datum within a representative inspection system, and examining each face of the plurality of faces of the mechanical part datum, wherein examining each face of the plurality of faces of the mechanical part datum comprises dividing the face into regions as a function of stylus tip data. The method comprises generating a fixture adapter model for the mechanical part datum as a function of a local region of the mechanical part datum, generating a measurement of at least a pair of part geometric data, wherein generating a measurement comprises selecting the at least a pair of part geometric data as a function of the at least an alignment datum and displaying the measurement of at least the pair of part geometric data. The method comprises producing the fixture adapter.

20 Claims, 9 Drawing Sheets

(56) References Cited

U.S. PATENT DOCUMENTS

| | | | | |
|---|---|---|---|---|
| 11,162,770 | B2* | 11/2021 | Boyd | G05B 19/41885 |
| 2002/0035435 | A1* | 3/2002 | Ninomiya | H01L 21/67288 |
| | | | | 702/35 |
| 2014/0157861 | A1* | 6/2014 | Jonas | G01B 5/008 |
| | | | | 73/1.79 |
| 2015/0300798 | A1* | 10/2015 | Pettersson | G01B 5/008 |
| | | | | 33/503 |
| 2016/0146589 | A1* | 5/2016 | Jonas | G01B 21/045 |
| | | | | 33/503 |
| 2017/0216981 | A1* | 8/2017 | Lee | B25J 13/08 |
| 2017/0284785 | A1* | 10/2017 | Somerville | G01B 5/008 |
| 2019/0213724 | A1* | 7/2019 | Avrahami | G05B 19/41875 |

* cited by examiner

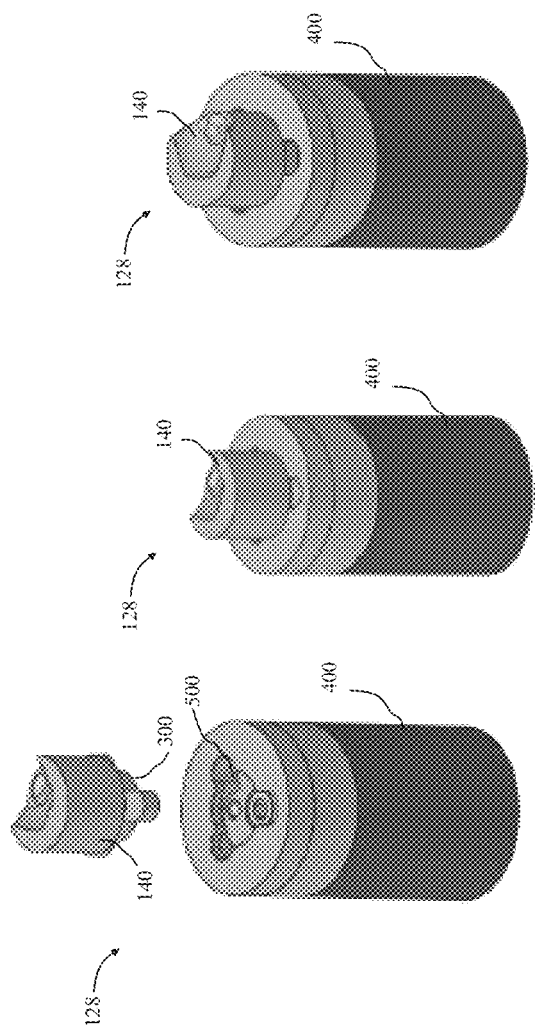

METHODS AND SYSTEMS FOR AN IN-LINE AUTOMATED INSPECTION OF A MECHANICAL PART

RELATED APPLICATION DATA

This application is a continuation of Non-provisional application Ser. No. 16/803,341 filed on Feb. 27, 2020 and entitled "METHODS AND SYSTEMS FOR AN IN-LINE AUTOMATED INSPECTION OF A MECHANICAL PART," now U.S. Pat. No. 11,162,770 B2, issued Nov. 2, 2021, the entirety of which is incorporated herein by reference.

FIELD OF THE INVENTION

The present invention generally relates to the field of computer-aided design and structure fabrication. In particular, the present invention is directed to methods and systems for an in-line automated inspection of a mechanical part.

BACKGROUND

Inspection of manufactured parts typically includes measuring, examining, testing and/or gauging one or more characteristics of a part and comparing the results with the specified requirements to determine if the requirements for each characteristic are properly met. A commonly implemented means of inspection in manufacturing is by utilizing a coordinate-measuring machine (CMM). Coordinate-measuring machines traditionally requires an extensive amount of upfront programming time. The programming generally consists of translating a component/part print, containing measurement dimensions of interest, to the user interface of a measurement software, such as PC-DMIS, a Hexagon product, or Calypso, a Zeiss product. This process typically requires trained power users of the software and is relatively time-consuming. Due to the need of trained power users and time, this process is not apt to easy scalability if you are looking to create inspection routines for many parts very quickly. Additionally, the CMM requires extensive amounts of time for planning, configuring, and setting up the manufactured part to be measured. Due to the need for a manufactured part to be completely static when being measured by the CMM and the need for the CMM to be knowledgeable of the placement of the part to properly perform a measurement, one of the most time and skilled labor-intensive steps is establishing precisely where on the table the part has been fastened, referred to as alignment. Thus, it is often extremely challenging to inspect a manufactured part quickly and in a scalable manner utilizing a coordinate-measuring machine.

SUMMARY OF THE DISCLOSURE

In an aspect, a method of an in-line automated inspection of a mechanical part is presented. The method comprises receiving a mechanical part datum from a user device. The method comprises orienting, by an automated operator at an inspection module, the mechanical part datum within a representative inspection system, wherein the representative inspection system comprises a visual representation of a coordinate-measuring machine and fixturing system. The method comprises examining, at the inspection module, each face of the plurality of faces of the mechanical part datum, wherein examining each face of the plurality of faces of the mechanical part datum comprises dividing the face into regions as a function of stylus tip data. The method comprises generating, at the inspection module, a fixture adapter model for the mechanical part datum as a function of a local region of the mechanical part datum. The method comprises generating, at the inspection module, a measurement of at least a pair of part geometric data, wherein generating a measurement comprises selecting, by the automated operator, the at least a pair of part geometric data as a function of the at least an alignment datum and displaying, to the automated operator on a graphical user interface, the measurement of at least the pair of part geometric data. The method comprises producing the fixture adapter.

In another aspect, a system of an in-line automated inspection of a mechanical part is presented. The system is designed and configured to receive a mechanical part datum from a user device. The system is further designed and configured to orient, by an automated operator at an inspection module, the mechanical part datum within a representative inspection system, wherein the representative inspection system comprises a visual representation of a coordinate-measuring machine and fixturing system. The system is further designed and configured to examine, at the inspection module, each face of the plurality of faces of the mechanical part datum, wherein examining each face of the plurality of faces of the mechanical part datum is designed and configured to divide the face into regions as a function of stylus tip data. The system is further designed and configured to generate, at the inspection module, a fixture adapter model for the mechanical part datum as a function of a local region of the mechanical part datum. The system is further designed and configured to generate, at the inspection module, a measurement of at least a pair of part geometric data, wherein generating a measurement is designed and configured to select, by the automated operator, the at least a pair of part geometric data as a function of the at least an alignment datum and display, to the automated operator on a graphical user interface, the measurement of at least the pair of part geometric data. The system is further designed and configured to produce the fixture adapter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5A-C are computer renderings of an embodiment of functional installation of a fixture adapter and a fixturing system;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to methods and systems for in-line automated inspection of a mechanical part. Part alignment is a laborious part of existing CMM programming and various strategies exist for different circumstances. These are employed through the operator by experience and involve using discrete points the CMM touches to establish part alignments. A difficulty of existing CMM programming includes measuring many different geometries sequentially, in a short amount of time, primarily the individual set-up and change-over processes. Embodiments of the methods and systems herein describe a means for in-line automated inspection of a mechanical part by a novel process which automates many of the features of inspection traditionally requiring manual manipulation, automating the alignment processes, and automatically generating fixtures for use in known, standardized locations within the system's novel configuration. In an embodiment, the novel in-line automated inspection of a mechanical part comprises receiving a mechanical part datum from a user device, orienting the mechanical part datum within a representative inspection system, wherein the representative inspection system comprises a visual representation of a coordinate-measuring machine and fixturing system, generating a fixture adapter model for the mechanical part datum as a function of a local region of the mechanical part datum, examining each face of the plurality of faces of the mechanical part datum, wherein examining each face of the plurality of faces of the mechanical part datum comprises dividing the face into regions as a function of stylus tip data, generating a measurement of at least a pair of part geometric data, wherein generating a measurement comprises selecting the at least a pair of part geometric data as a function of the at least an alignment datum and displaying the measurement of at least the pair of part geometric data, and producing the fixture adapter.

Figure 1:
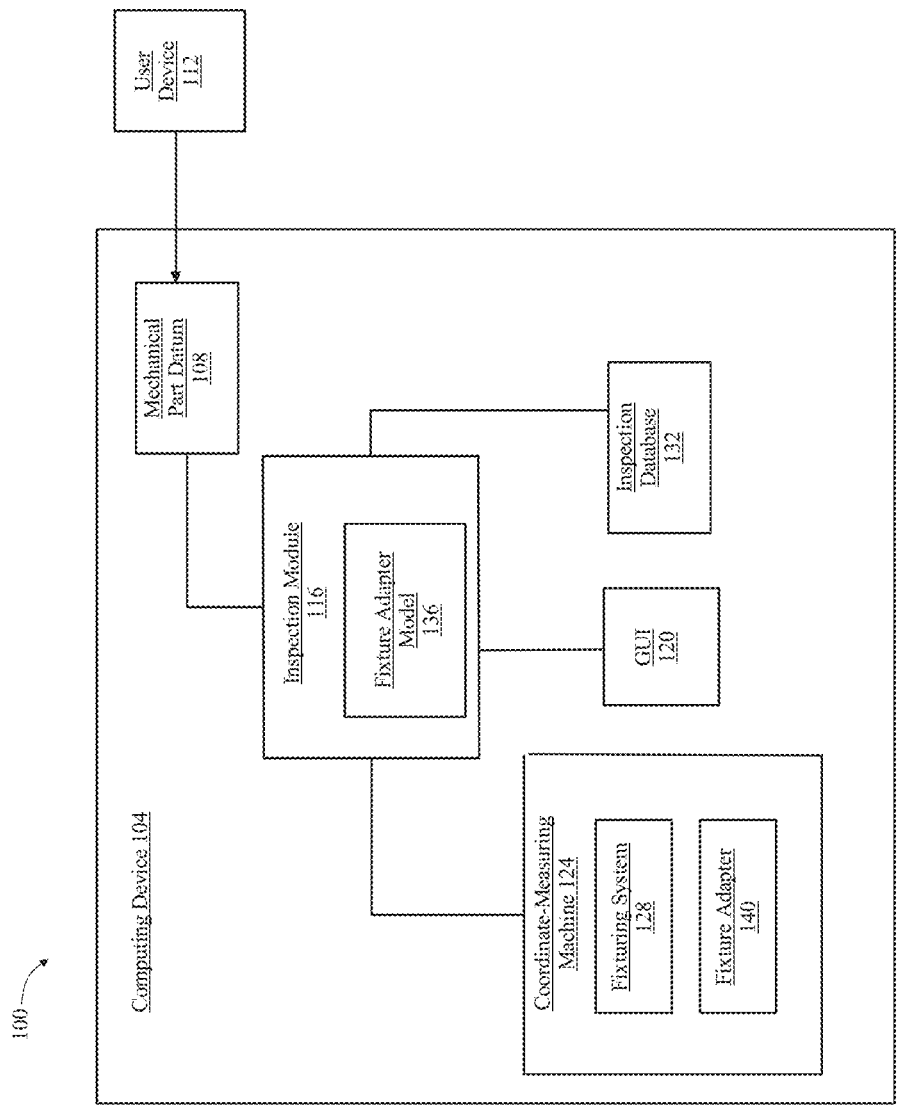
FIG. 1 is a high-level block diagram illustrating an embodiment of a system for an in-line automated inspection of a mechanical part.

Referring now to FIG. 1, a block diagram of system 100 of an in-line automated inspection of a mechanical part is presented. System 100 is configured to inspect the formed mechanical part and can include computing device 104, mechanical part datum 108, inspection module 116, fixture adapter model 136, inspection database 132, graphical user interface (GUI) 120, coordinate-measuring machine 124, fixturing system 128, and any combination thereof.

Still referring to FIG. 1, system 100 is configured to include computing device 104. Computing device 104 may include any computing device as described herein, including without limitation, a microcontroller, microprocessor, digital signal processor (DSP) and/or system on a chip (SoC) as described herein. Computing device may include, be included in, and/or communicate with a mobile device such as a mobile telephone or smartphone. Computing device may include, be included in, and/or communicate with an automated manufacturing device, such as an additive manufacturing device, subtractive manufacturing device, injection molding device, and the like. Computing device 104 may include a single computing device operating independently, or may include two or more computing device operating in concert, in parallel, sequentially or the like; two or more computing devices may be included together in a single computing device or in two or more computing devices. Computing device 104 with one or more additional devices as described below in further detail via a network interface device. Network interface device may be utilized for connecting a computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device 104 or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, system 100 is configured to receive mechanical part datum 108 from user device 112. Mechanical part datum 108, as used herein, includes any data describing and/or relating to a three-dimensional model of a part to be manufactured. Mechanical part datum 108 may include any data describing and/or relating to a three-dimensional model of a mechanical part, a non-functional part, a non-mechanical part, a cosmetic part, and/or any combination thereof, wherein the part is to be manufactured. Manufacturing may include, without limitation, additive manufacturing, subtractive manufacturing, injection molding, and the like. Mechanical part datum may include, without limitation, a computer model of a part to be manufactured. A computer model, as described herein, is a digital model of a physical structure as created using computer-aided design (CAD) modeling software. For example and without limitation, computer-aided design (CAD) software may include SOLIDWORKS® software and/or CATIA software (available from Dassault Systèmes SolidWorks Corp, Waltham, Mass.), AUTOCAD® software and/or Fusion 360 software (available from Autodesk, Inc., San Rafael, Calif.), PTC Creo software (available from PTC, Inc., Boston, Mass.), Siemens NX software (available from Siemens PLM Software, Plano, Tex.) and MICROSTATION® software (available from Bentley Systems, Inc., Exton, Pa.), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a solid modeling format based on the Initial Graphics Exchange Specification (.IGS) and/or the like. For example and without limitation, the computer model further includes information about the geometry and/or other defining properties of the mechanical part's structure, such as total number of faces of mechanical part datum 108, total quantity of mechanical part datum 108 for manufacture, the material to which the mechanical part datum 108 is to be manufactured, manufacturing process to be used for the mechanical part datum 108. Persons skilled in the art, upon reviewing the entirety of this disclosure, will be aware of various datums which may be suitable for use as mechanical part datum consistently with this disclosure.

With continued reference to FIG. 1, user device 112 may be configured to, without limitation, transfer a transmission of communication to computing device 104. Transmission may include any transmission as described herein. For example and without limitation, transmission may include file transfer protocols such as File Transfer Protocol (FTP), Hypertext Transfer Protocol (HTTP), SSH File Transfer Protocol (SFTP), Secure Copy (SCP), Accelerated File Transfer Protocol (AFTP), and the like. User device 112 may include an additional computing device, such as a mobile device, laptop, desktop computer, tablet, and the like. As an example and without limitation, user device 112 may be a computer and/or workstation operated by an engineering professional. Persons skilled in the art, upon reviewing the entirety of this disclosure, will be aware of various devices which may be suitable for use as user client device consistently with this disclosure. Though the illustrated embodiment of FIG. 1 depicts only one user device in communication with computing device 104, in other embodiments two or more user devices may be in communication with computing device 104 and each be configured to transmit a transmission of data, wherein the data may include data relevant to the inspection design, such as critical dimensions requiring measurements and tolerances.

With continued reference to FIG. 1, system 100 may include inspection module 116 operating on computing device 104. Inspection module 116 may include any hardware and/or software module. Inspection module 116 is configured to orient, by an automated operator, the mechanical part datum 108 within a representative inspection system. The representative inspection system comprises a visual representation of a coordinate-measuring machine and fixturing system. Orientation may be displayed to an automated operator using graphical user interface 120. Automated operator, as used herein, is a person, hardware, and/or software which engages in any step and/or combination of steps of the manufacturing process of the mechanical part. A step of the manufacturing process may include, for example and without limitation, receiving a mechanical part datum from a user client device, orienting the mechanical part datum within a representative inspection system, and/or any step utilizing the coordinate-measuring machine. For example and without limitation, an automated operator may include a person interacting with system 100, wherein a person may further include an inspection designer who builds the fixture model and specifies measurements, a floor operator running the MINI using the program and fixtures created by the designer, and the like.

With continued reference to FIG. 1, GUI 120 may include without limitation, a form or other graphical element having data entry fields, wherein a user may enter a user symptom datum. GUI 120 may include data entry fields that allow for a user to enter free form textual inputs. GUI 120 may provide a representative inspection system including a visual representation of a coordinate-measuring machine and associated fixturing system. In an embodiment, GUI 120 may further provide a representative inspection system including a visual representation of the part and stylus which allows the interactive addition of measurements and alignment datums by a user, wherein a user may include an automated operator. GUI 120 may provide drop-down lists, where users may be able to select one or more entries to indicate one or more datums of the fixture adapter model.

Still referring to FIG. 1, inspection module 116 is configured to orient, by an automated operator, the mechanical part datum 108 within a representative inspection system. As described above, the representative inspection system comprises a visual representation of a coordinate-measuring machine 124 and fixturing system 128. Coordinate-measuring machine 124, as described herein, is a device that measures the geometry of physical objects by sensing discrete points on the surface of the object with a stylus. The stylus, for example and without limitation, may include mechanical, optical, laser, white light, and the like. Coordinate-measuring machine 124 may be controlled by an automated operator, controlled by a computer, and/or both. The coordinate-measuring machine 124 specifies the stylus's position in terms of the stylus's displacement from a specified datum of fixturing system 128 in a three-dimensional Cartesian coordinate system. Coordinate-measuring machine 124 may further include, as an example and without limitation, controlling the angle of the stylus. The coordinate-measuring system further includes, as another example and without limitation, the stylus can measure all six possible degrees of freedom. Fixturing system 128 may consist of an array of raised pillars, wherein the raised pillars include fixture adapter interfaces providing potential support and fixturing location for an array of mechanical parts. Orienting the mechanical part datum within the representative inspection system is further configured to record the relative position of the mechanical part datum as a function of a specified datum on the fixturing system 128. As described herein, the specified datum on the fixturing system 128 is a feature of fixturing system 128 specifically determined to be the reference surface of the fixturing system 128. In an embodiment, the specified datum on the fixturing system 128 may include for example and without limitation, the top center point of a pillar determined to be pillar "A".

Continuing to refer to FIG. 1, inspection module 116 is further configured to examine each face of a plurality of faces of the mechanical part datum 108. Examining each face of mechanical part datum 108 comprises dividing each face into respective regions as a function of stylus tip data. As described herein, a face is a portion of a surface, bounded by edges, where both edges and surfaces are defined mathematically of a solid figure that a mechanical part comprises. Surfaces, for instance, may include planar surfaces, cylindrical surface, lofted surface, defined surface, and the like. The solid figure may further include, a triangulated, meshed and/or three-dimensional representation of the mechanical part datum. Stylus tip data, as described herein, is data describing whether the tip of the stylus can touch a given point of the representation of the mechanical part in the representative inspection system without inadvertently touching any other points of the mechanical part. Dividing the face into regions as a function of stylus tip data is further configured to determine at least a touch region of the mechanical part datum as a function of stylus tip data and determining at least a non-touch region of the mechanical part datum as a function of stylus tip data. The touch region, as described herein, is a point of the visual representation of the mechanical part in the representative inspection system where the stylus tip can touch without inadvertently touching another point of the visual representation of the mechanical part. The non-touch region, as described herein, is a point of the visual representation of the mechanical part in the representative inspection system where the stylus tip cannot touch without inadvertently touching another point of the visual representation of the mechanical part. In an embodiment, system 100 may provide a means of creating obstacles which affect dividing the face into regions as a function of stylus tip data as a function of the manufacturing process. For instance, injection molding may specify that the parting edge and ejector pin pads are obstacles to be avoided, direct machined parts may specify that tab vestiges are obstacles to be avoided, and the like.

With continued reference to FIG. 1, examining each face of the plurality of faces of the mechanical part datum is further configured to sample each touch region of a plurality of touch regions of mechanical part datum 108. Sampling, as described herein, is the selection of regions within the population of regions to estimate characteristics of the whole population of regions. Sampling each touch region of the plurality of touch regions is further configured to determine the distance from each touch region of the plurality of touch regions to the nearest at least a non-touch region. Persons skilled in the art, upon reviewing the entirety of this disclosure, will be aware of various possible variations of sampling as well as methods that may be used to determine the distance from each touch region of the plurality of touch regions to the nearest at least a non-touch region.

Referring still to FIG. 1, examining each face of mechanical part datum 108 further comprises receiving, from the automated operator by the graphical user interface 120, a manufacturing goal. As described herein, a manufacturing goal is a manufacturing constraint specific to mechanical part datum 108 in which the automated operator determines to be a limiting factor of fixture adapter model 136 as a function of mechanical part datum 108. As an example and without limitation, a manufacturing goal may include finding three points in which their surface normal point upward with a specified angle, such as cosine similarity, wherein the three points can be used to define a distance. For instance and without limitation, defining a distance may include defining a plane, wherein the plane is possible to be machined utilizing any machining process and/or steps of machining processes as described above and the plane is oriented in a manner in which a tool can reach the mechanical part. Cosine similarity, as used in this disclosure, is a measure of similarity between two non-zero vectors of an inner product space that measure the cosine of the angles between them. For example and without limitation, cosine similarity may be used to define a plane. As a further example and without limitation, cosine similarity may be used to define an edge. As another non-limiting example, cosine similarity may be used to define a line. As a further example and without limitation, a manufacturing goal may include finding the point containing the largest positive x-axis position and containing a normal closest to the positive x-axis. As another non-limiting example, a manufacturing goal may include staying a specific distance away from non-reachable regions, wherein the non-reachable region provides uncertainty on how to support the mechanical part datum. As another example and without limitation, a manufacturing goal may include an angle that maps a shape of mechanical part datum 108 with the smallest degree of error, wherein a surface feature of mechanical part datum 108 may be more effectively machined from one angle as compared to another as measured by the cycle time to machine the surface feature. Distance, as used in this disclosure, is the shortest distance from one part geometric data to another part geometric data, wherein the distance is measured from the centroid of each part geometric feature of the plurality of part geometric features. For instance, distance may be calculated from a point to the nearest point on the same or adjacent surface that is determined to be a non-reachable region by a stylus; this is calculated in order to overcome the uncertainty in part setup position by preferring surfaces where the stylus is less likely to inadvertently touch another surface. In an embodiment, distance may be calculated utilizing a combination of methods as of a result of a lack of concern for surfaces that bend away from a given point; for example distance may be calculated by inflating the stylus model until the stylus interacts with another surface or distance may be calculated by catching areas of the surface of the part that have been determined to be non-reachable through the non-touch region by applying pressure to the stylus tip into the surface of the part and determining if the stylus tip intersects any surfaces determined to be non-touch regions. Calculation of distance may include without limitation any calculation and/or combination of calculations determined effective and/or efficient for purposes of calculating distance. In an embodiment, for instance and without limitation, a distance may include a minimum and/or maximum threshold distance to stay away from each non-touch region of the plurality of non-touch regions. Threshold may be set according to a confidence interval or degree of precision in a machining process to be used, could be based off tool width, material, number of surface features, and the like. The output of a linear combination of at least a manufacturing goal and the distance from at least a touch region to the nearest non-touch region of the at least a non-touch region must be minimized. In an embodiment, the output of a linear combination may further include an alignment feature datum. Alignment feature datum, as described herein, is any data resulting from a calculation including each part geometric datum, each touch region of the plurality of touch regions, and the non-reachable regions. For instance and without limitation, a calculation may include data describing the distance from the x-axis part extent, data describing the angle of the surface vector from the −x vector, data describing the 3-D distance from an existing alignment datum. For instance, and without limitation, graphical user interface 120 may be provided to user with a set of sliders or other user inputs permitting a user to indicate relative and/or absolute importance of each variable to the user. Sliders or other inputs may be initialized prior to user entry as equal or may be set to default values based on results of any machine-learning processes or combinations thereof as described in further detail below. Persons skilled in the art, upon reviewing the entirety of this disclosure, will be aware of various possible variations of manufacturing goals that may be received by the automated operator on graphical user interface 120.

With continued reference to FIG. 1, examining each face of mechanical part datum 108 can further include generating a loss function of the distance from each touch region to the nearest non-touch region and the manufacturing goal. Further, examining each face can include minimizing the loss function and selecting an alignment datum as a function of minimizing the loss function. The loss function is minimized as a function of the linear combination of at least a manufacturing goal and the distance from at least a touch region to the nearest non-touch region of the at least a non-touch region. In an embodiment, the loss function may further be minimized as a function of the alignment feature datum. Alignment datum, as described herein, is any data characterizing an orientation of the mechanical part relative to a coordinate system, wherein the data may be any data associated with examining each face of the plurality of faces of the mechanical part datum 108. The coordinate system, as used in this disclosure, may include any coordinate system as described above. For example and without limitation, the coordinate system may include a Cartesian coordinate system, wherein the system includes an x-axis, y-axis, and z-axis. For example and without limitation, the alignment datum may include textual data, numeric data, electronic file data and/or any combination thereof. Alignment datum may include, for example and without limitation, the distance from each touch region of the plurality of touch regions to the nearest at least a non-touch region. Alignment datum may include, as a further example and without limitation, at least a manufacturing goal. Alignment datum may include, as another non-limiting example, any data associated with the loss function, wherein the data may be any data as described above. In an embodiment, alignment datum may include surface point data, normal surface point pairs data, and any combination thereof. In an embodiment, alignment data may include instructions about how alignment data may be utilized within the CMM application software and/or any hardware and/or software associated with system 100. Persons skilled in the art, upon reviewing the entirety of this disclosure, will be aware of various datums that may be included as at least an alignment datum.

In an embodiment, inspection module 116 may compare one or more alignment datum options to a loss function representing an alignment strategy of the distance from each touch region of the plurality of touch regions to the nearest non-touch region and at least a manufacturing goal. Alignment, as described herein, is the combination of the distance from each touch region of the plurality of touch regions to the nearest non-touch region and at least a manufacturing goal is the combination that produces surface wherein the surface has the largest area of touch regions determined for the mechanical part datum 108. A loss function may include a linear combination of variables, weighted by coefficients representing relative importance of each variable in generating at least an optimal alignment datum. For instance, a variable such as x-axis position may be multiplied by a first coefficient representing the importance of x-axis position, a second variable such as y-axis position may be multiplied by a second coefficient representing the importance of y-axis position, a degree of variance from a specified position in the representative inspection system may be represented as another parameter, which may be multiplied by an additional coefficient representing an importance of that variable. For example and without limitation, x-axis position may be weighted higher than x-axis direction, wherein the linear combination of variables may include an x-axis position multiplied by a coefficient of 0.75 and an x-axis direction multiplied by a coefficient of 0.25. As a further example and without limitation, the linear combination of variables may include a variable describing a point near to the x-extent of the part multiplied by a coefficient of 0.60 and a variable describing a surface normal point multiplied by a coefficient of 0.20 and a variable describing the largest distance from a non-touch region multiplied by a coefficient of 0.20. In an embodiment, inspection module 116 may employ different alignment strategies for different conditions; for instance inspection module 116 may employ a 3-2-1 strategy for initial part alignment or a best-fit strategy for sculpted surfaces, wherein the selection of alignment strategy may be selected by the inspection module 116, the automated operator, GUI 120, and/or determined automatically utilizing system 100. Persons skilled in the art, upon reviewing the entirety of this disclosure, will be aware of different variables that may be weighted by various coefficients. In an embodiment, an example set of manufacturing goals may be specified to find a plurality of surfaces to maximize the effectiveness of the best-fit alignment strategy, wherein the surfaces are spaced apart and the surfaces having different surface normal. Use of linear combination is provided only as an illustrative example; other loss functions may alternatively or additionally be used, including without limitation, higher-order polynomial expressions or the like.

Still referring to FIG. 1, a loss function, as described herein, is an expression of an output which an optimization algorithm minimizes to generate an optimal result. As a non-limiting example, inspection module 116 may calculate variables of each manufacturing goal, calculate an output of loss function using the variables, and select alignment datum that produces an output having the lowest size, according to a given definition of "size" of the set of outputs representing each of the plurality of alignment datum. Size, for example and without limitation, may include absolute value, numerical size, or the like. Selection of different loss functions may result in identification of different alignment datum as generating minimal outputs. Selection of different loss functions may further result in identification of different alignment feature datum as generating minimal outputs. For instance, where y-axis position is associated in a first loss function with a large coefficient or weight, a y-axis position having a smaller position may minimize the first loss function, whereas a second loss function wherein y-axis position has a smaller coefficient but degree of variance from a non-touch region has a larger coefficient may produce a minimal output for a different alignment datum and having a larger x-axis position but more closely hewing to the nearest non-touch region. In an embodiment, at least a plurality of alignment feature datum may be calculated for each alignment strategy of the plurality of alignment strategies and assigned a weight for each sampled point of the plurality of sampled points, wherein the plurality of alignment feature datum is calculated for all the touch regions of the plurality of touch regions.

Alternatively or additionally, and still referring to FIG. 1, each alignment datum may be represented by a loss function having the same form as the loss function associated with the plurality of alignment datum. Inspection module 116 may compare the former to the latter using an error function representing average difference between the two loss functions. Error function may, as a non-limiting example, be calculated using the average difference between coefficients corresponding to each variable. Alignment datum may be chosen to minimize the error function, for example alignment datum with minimal "loss" may be selected to minimize the error function. In an embodiment, the error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of loss function may be scaled and/or normalized; this may permit comparison and/or error function calculation to be performed without skewing by varied absolute quantities of numbers.

With continued reference to FIG. 1, the loss function may be generated using machine learning to produce loss function. For example and without limitation, the machine learning process may include linear regression, logistic regression, decision tree, SVM, Naïve Bayes, k-nearest-neighbor, k-means, random forest, dimensionality reduction algorithms, gradient boosting algorithms, and the like. Loss function may be user-specific, using a training set composed of past user selections, wherein the training set may be updated continuously. Loss function may initially be seeded using one or more automated operator entered manufacturing goals as described above. User may enter a new command changing the loss function, and then subsequent manufacturing goals may be used to generate a new training set to modify the new expression.

With continued reference to FIG. 1, mathematical expression and/or loss function may be generated using machine learning using a multi-user training set. The multi-user training set may be created using data of a cohort of mechanical parts having similar materials, number of faces, volume, number of mechanical parts to be manufactured, total holes in mechanical part, required tool change overs, and the like. This may alternatively or additionally be used to seed a loss function for a user, which may be modified by further machine learning and/or regression.

Referring still to FIG. 1, examining each face of the mechanical part datum 108 further includes selecting at least an alignment datum as a function of minimizing the loss function. Alignment datum may include any alignment datum as described herein. Selecting at least an alignment datum as a function of minimizing the loss function is configured to store the at least an alignment datum in inspection database 132, as described below in more detail in reference to FIG. 2. Inspection database 132 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, a dataset may include textual data, such as numerical, character, and/or string data. Textual data may include, for example and without limitation, a description of the mechanical part and/or description of the manufacturing process associated to the mechanical part. In general, there is no limitation on forms textual data or non-textual data used as dataset may take; persons skilled in the art, upon reviewing the entirety of this disclosure, will be aware of various forms which may be suitable for use as dataset in the inspection database consistently with this disclosure.

Continuing to refer to FIG. 1, inspection module 116 operating on computing device 104 is further configured to generate fixture adapter model 136 for the mechanical part datum 108 as a function of a local region of the mechanical part datum 108. The local region, as described herein, is a region of the visual representation, wherein the region has been determined by the automated operator to be a necessary region to support by the fixture adapter model 136 during inspection. The fixture adapter model, as used in this disclosure is a computer representation of a part used to connect the formed mechanical part to the fixturing system for inspection. The fixture adapter model 136 may be generated in any suitable manner, such as using CAD and/or CAM software having a graphical user interface that allows a user to manipulate computer representations of the fixture adapter model, The fixture adapter model 136 may be generated utilizing any computer aided design software as described in the entirety of this disclosure. For instance and without limitation, fixture adapter model 136 may be configured into a three-dimensional model such as a CAM model, STL model, or like that in later steps of method 700, as described below in further detail in reference to FIG. 7, will be used to guide the operation of one or more manufacturing devices to perform the manufacturing process to produce the fixture adapter. The fixture adapter model 136 may be configured to rotate within the computer representation using any means including, for example and without limitation the automated operator utilizing graphic user interface 120 to rotate a part, or automatic fixturing of the fixture adapter model 136, wherein automatic fixturing further includes, without limitation, position and rotation. The fixture adapter model may be, for example and without limitation, configured individually for each mechanical part datum 108. The fixture adapter model, for example and without limitation, may include a coordinate system, wherein the coordinate system is oriented to align to the geometric center of a pillar of the fixturing system, the fixturing system may be represented as a computer model in the three-dimensional model of fixture adapter model 136. Generating a fixture adapter model 136 may include, for example and without limitation, incorporating the geometry of the mechanical part datum.

With continued reference to FIG. 1, inspection module 116 operating on computing device 104 is configured to generate fixture adapter model 136, wherein generating further includes positioning a male coupler in the fixture adapter model 136. A male coupler, as described herein, is a solid unique shape extending from the bottom-most face of fixture adapter model 136. The male coupler of the fixture adapter model 136 is configured to functionally install to the female coupler of fixturing system 128, wherein the connection of the male coupler and the female coupler connect the fixture adapter model 136 to the female coupler on the pillar of fixturing system 128. The male coupler of fixture adapter model 136 is described in greater detail below. Generating the fixture adapter model 136 is further configured to include creating at least a window in fixture adapter model 136. The at least a window, as described herein, is a void space of the fixture adapter model 136 to allow the probe of the coordinate-measuring system to touch the formed mechanical part and not touch the fixture adapter model 136. For instance, creating at least a window in fixture adapter model 136 may include, without limitation, removing small volumes of material from the computer representation of the fixture adapter model 136. Generating the fixture adapter model 136 is further configured to include positioning at least a pocket in the fixture adapter model 136. The pocket, as described herein, is a well in fixture adapter model 136 designed to contain an adhesive element, wherein the adhesive element is to prevent movement of the formed mechanical part during inspection by the coordinate-measuring machine 124. Positioning at least a pocket may include automatic positioning, interactive positioning by the automated operator, or any combination thereof.

Referring still to FIG. 1, inspection module 116 operating on computing device 104 is configured to generate fixture adapter model 136, wherein generating further includes inflating the mechanical part datum 108 by a dimensional factor. The mechanical part datum 108 may include the three-dimensional representative model of the mechanical part datum 108. As described herein, the dimensional factor is variable factor for each mechanical part datum and is calculated as a function of the size of the mechanical part datum, material of the mechanical part datum, and/or manufacturing processes required to machine the mechanical part datum. The dimensional factor may represent an accommodation of any warp and/or dimensional error of the formed mechanical part or the machined fixture adapter model 136. Generating the fixture adapter model 136 is further configured to include subtracting the mechanical part datum 108 from the fixture adapter model 136. Subtracting the mechanical part datum 108, as described herein, is a 3-dimensional Boolean subtraction operation on a mesh, wherein the mesh may include manufacturing request datum 108, mesh manufacturing request datum, and the like. Subtracting the mechanical part datum 108 from the fixture adapter model 136 may include, for example and without limitation, extracting the mechanical part datum 108 from the fixture adapter model 136, wherein only the fixture adapter model 136 is visible. Subtracting may include, as a further example and without limitation, hiding the mechanical part datum 128 to allow only fixture adapter model 136 to be distinguishable. Generating the fixture adapter model 136 is further configured to include storing the fixture adapter data in the inspection database 132. Storing the fixture adapter data may include any steps and/or combination of steps of storing as described herein. Fixture adapter data, as described herein, is any data associated with generating the fixture adapter model, wherein the data may include textual data, numeric data, electronic file data and/or any combination thereof. Fixture adapter data may include, for example and without limitation, the computer aided design of the fixture adapter model. Fixture adapter model may include, as a further example and without limitation, the dimensional factor used to inflate the mechanical part datum. Persons skilled in the art, upon reviewing the entirety of this disclosure, will be aware of data that may be included as fixture adapter data.

With continued reference to FIG. 1, inspection module 116 operating on computing device 104 is further configured to generate a measurement of at least a pair of part geometric data. Generating a measurement is configured to include selecting, by the automated operator, the at least a pair of part geometric data as a function of the alignment datum. The part geometric data, as described herein, is a set of part geometric data regarded as a unit, wherein a set includes two or more. As described herein, part geometric data is a property of a solid figure. The part geometric data may include, for example and without limitation, the face of the mechanical part datum 108, such as a flat surface. As a further example and without limitation, part geometric data may further include a mechanical part datum 108 edge, such as where at least two faces meet. As another non-limiting example, part geometric data may include a vertex of the mechanical part datum 108, such as a corner where at least two edges meet. Selecting may include, for example and without limitation, selection by the automated operator utilizing the graphical user interface 120. Selecting may include, for example and without limitation, selection by automatic processes including machine-learning processes. Generating a measurement can further include displaying, automated operator via the graphical user interface 120, the measurement of the at least a pair of part geometric data. In an embodiment, generating a measurement may further include receiving measurements from data embedded in the manufacturing request datum 108 and/or receiving measurements from data stored in a database, wherein a database may include any database as described in the entirety of this disclosure. As described herein, the measurement of the at least a pair of part geometric data is the size, length, or distance between the at least a pair of part geometric data. Measurement may be generated utilizing any unit of size, length and/or distance. For example and without limitation, measurement may include meter, centimeter, millimeter, micrometer, nanometer, feet, inches, yards, picas, and the like. Persons skilled in the art, upon reviewing the entirety of this disclosure, will be aware of various units that may be included as measurements of the at least a pair of part geometric data.

Alternatively or additionally, in an embodiment, system 100 may be configured without the use of the fixture adapter model 126. In an embodiment, the method of an in-line automated inspection of a mechanical part may be performed without the generation of the fixture adapter model 136 for the mechanical part datum 108. As an example and without limitation, the method of an in-line automated inspection of a mechanical part may include utilizing a universal fixture adapter model, wherein the universal fixture adapter model is configured to fit to mechanical parts sharing an element of part geometric data.

Continuing to refer to FIG. 1, inspection module 116 operating on computing device 1204 is configured to display the measurement of the pair of part geometric data, wherein displaying can further include verifying, automated operator via GUI 120, the measurements of the at least a pair of part geometric data. Verification may include, for example and without limitation, an indication of selection by the automated operator utilizing the graphical user interface 120.

Indication of selection may include, for example and without limitation, sliders or other user inputs permitting a user to indicate relative and/or absolute importance of each variable to the user. As a further example and without limitation, indication of selection may include an interaction with the graphical user interface 120 indicating the acceptance of the measurements of the at least a pair of part geometric data, wherein an interaction may include selecting a button signifying 'YES', selecting the measurement directly, matching the measurements of the at least a pair of part geometric data on the graphical user interface 120, and the like. Persons skilled in the art, upon reviewing the entirety of this disclosure, will be aware of various means of indicating a selection that may be included as verifying the measurements of the at least a pair of part geometric data. In an embodiment, inspection module 116 is further configured to store the verified measurement data in the inspection database 132. Storing the verified measurement data may include any step and/or combination of steps of storing as described herein. Verified measurement data, as described herein, is any data associated with generating a measurement of at least a pair of part geometric data, wherein the data may include textual data, numeric data, electronic file data and/or any combination thereof. Verified measurement data may include, for example and without limitation, the measurements of the at least a pair of part geometric data as verified by the automated operator on graphical user interface 120. Persons skilled in the art, upon reviewing the entirety of this disclosure, will be aware of data that may be included as verified measurement data.

Referring again to FIG. 1, system 100 is configured to produce fixture adapter 140 as a function of the measurement of the at least a pair of part geometric data. The fixture adapter, as used in this disclosure is the machined fixture adapter model utilizing any manufacturing process as described herein, wherein the fixture adapter model is a computer model of the part used to connect the formed mechanical part to the fixturing system for inspection utilizing the coordinate-measuring machine. The fixture adapter model may be, for example and without limitation, manufactured utilizing manufacturing processes such as, additive manufacturing, subtractive manufacturing, injection molding, and any combination thereof. In an embodiment, Production, as described herein may include any manufacturing process with capabilities to create fixture adapter 140. For example and without limitation, production may include any step and/or combination of steps of any additive manufacturing processes, such as three-dimensional printing. As a further example and without limitation, production may include any step and/or combination of steps of any subtractive manufacturing processes. As another non-limiting example, production may include any step and/or combination of steps of any injection molding processes. Producing the fixture adapter 140 may be accomplished utilizing any materials compatible for any manufacturing processes, as described herein. Suitable materials may include, for example and without limitation, metals, thermoplastics, thermosets, ceramics, graphite, biodegradable materials, medical and biochemical materials, nylons, acetals, polycarbonates, and the like. Persons skilled in the art, upon reviewing the entirety of this disclosure, will be aware of manufacturing processes that may be included as production.

Figure 2:
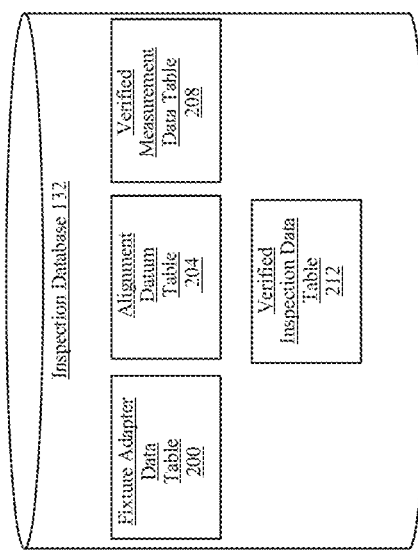
FIG. 2 illustrates a block diagram of an embodiment of an inspection database.

Referring now to FIG. 2, an embodiment of an inspection database 132 is illustrated. Inspection database 132 may be implemented as a hardware and/or software module. Inspection database 132 may be implemented, without limitation, as a relational database, a key-value retrieval datastore such as a NOSQL database, or any other format or structure for use as a datastore that a person skilled in the art would recognize as suitable upon review of the entirety of this disclosure. Inspection database 132 may contain datasets that may be utilized by inspection module 116 and/or any hardware and/or software module operating on computing device 104. In an embodiment, datasets contained within inspection database 132 may be categorized and/or organized according to shared characteristics. For instance and without limitation, one or more tables contained within inspection database 132 may include fixture adapter data table 200. Fixture adapter data table 200 may include any fixture adapter data, as defined above in reference to FIG. 1. The fixture adapter data table 200 may contain data describing the computer aided design of the fixture adapter model. Fixture adapter data table 200 may include, as a further example and without limitation, data describing the dimensional factor used to inflate the mechanical part datum 108. One or more data tables in inspection database 132 may include alignment datum table 204. Alignment datum table 204 may include any alignment datum, as described above in reference to FIG. 1. The alignment datum table 204 may contain data associated with examining each face of the plurality of faces of the mechanical part datum 108, wherein the data may include textual data, numeric data, electronic file data and/or any combination thereof. Alignment datum table 204 may include, for example and without limitation, data describing the distance from each touch region of the plurality of touch regions to the nearest at least a non-touch region. Alignment datum may include, as a further example and without limitation, at least a manufacturing goal. One or more tables in inspection database 132 may include verified measurement data table 208. Verified measurement data table 208 may include any verified measurement data as described above in reference to FIG. 1. Verified measurement data table 208 may include any data associated with generating a measurement of at least a pair of part geometric data, wherein the data may include textual data, numeric data, electronic file data and/or any combination thereof. Verified measurement data table 200 may include, for example and without limitation, data describing the measurements of the at least a pair of part geometric data as verified by the automated operator on graphical user interface 120. Verified measurement data table 208 may include, as a further non-limiting example, data describing part geometric data and/or the at least a pair of part geometric data. One or more tables in inspection database 132 may include verified inspection data table 212. Verified inspection data table 212 may include any verified inspection data as described in further detail below. Verified inspection data table 212 may include any data associated with inspecting, utilizing the coordinate-measuring machine 124, the formed mechanical part and displaying, to the automated operator on a graphical user interface 120, the inspection data. For example and without limitation, the verified inspection data table 212 may include data describing the inspection data collected by inspecting the formed mechanical part utilizing the coordinate-measuring machine 124. As a further example and without limitation, verified inspection data table 212 may include data describing the verification of the inspection data by the automated operator utilizing the graphical user interface 120. Persons skilled in the art, upon reviewing the entirety of this disclosure, will be aware of various data tables which may be suitable for use in inspection database 132 consistently with this disclosure.

Figure 3B:
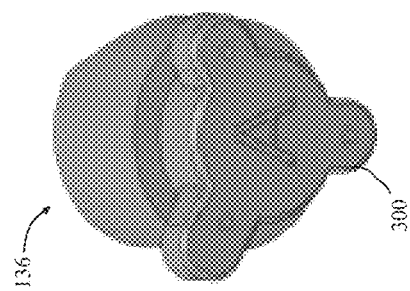
FIG. 3A-B are computer renderings of an embodiment of a fixture adapter model.
Figure 3A:
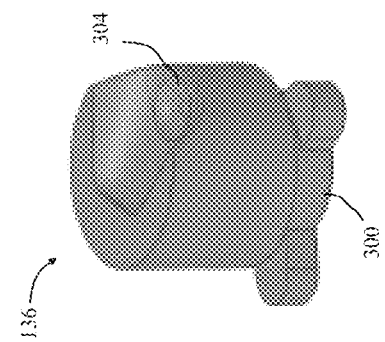

Referring now to FIGS. 3A-B, an embodiment of the fixture adapter model 136 is illustrated. The fixture adapter model 136, as described above in reference to FIG. 1, includes male coupler 300. Male coupler 300, as described above, is a solid unique shape extending from the bottom-most face of the fixture adapter model 136. The unique shape extending from fixture adapter model 136 matches the unique shape extruded into the female coupler of fixturing system 128 to enable fixture adapter model 136 and fixturing system 128 to enable functional installation. Fixture adapter model 136 is designed to maintain a fixed position of the formed mechanical part during inspection utilizing the coordinate-measuring machine 124. Fixture adapter model 136, as described above in reference to FIG. 1, includes at least a pocket 304, wherein the at least a pocket 304 is positioned by the automated operator and/or automatically. Pocket 304, as described above, is a well in the fixture adapter model 136 designed to contain an adhesive element, wherein the adhesive element is to prevent movement of the formed mechanical part during inspection by the coordinate-measuring machine 124. The adhesive element may include, for example and without limitation, resins, hot melt, contact spray, acrylic, anaerobic adhesive, conductive adhesive, epoxy adhesives, pressure adhesives, and/or any combination thereof.

Figures 4A, 4B:
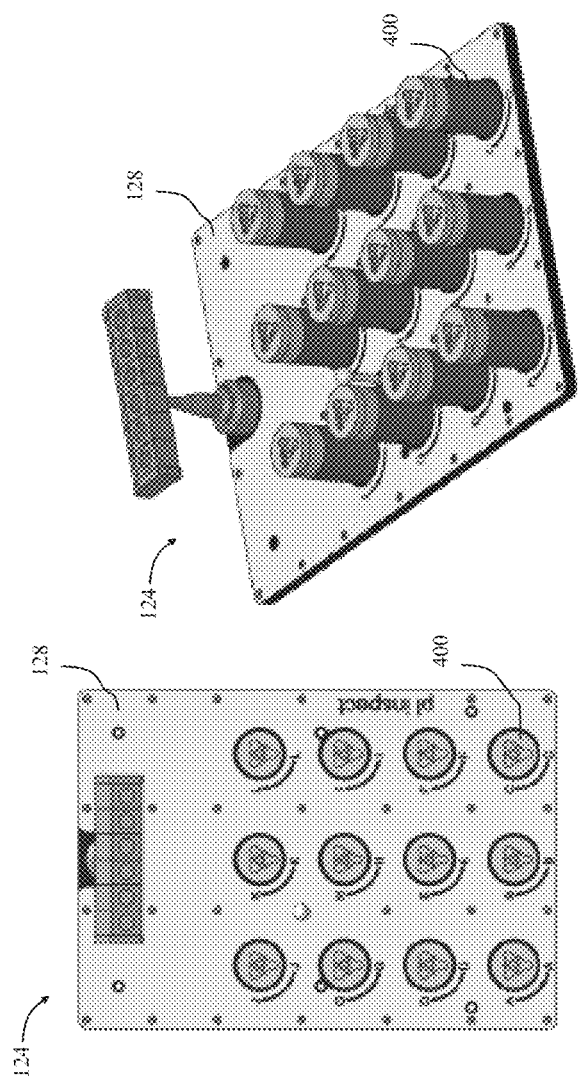
FIG. 4A-B are computer renderings of an embodiment of a fixturing system.

Referring now to FIGS. 4A-B, an embodiment of the fixturing system 128 of coordinate-measuring machine 124 is illustrated. FIG. 4A illustrates a top-down view of an embodiment of fixturing system 128 incorporated in coordinate-measuring machine 124. The fixturing system 128 includes at least a pillar 400. The at least a pillar 400 may include an array of the at least a pillar 400. The at least a pillar 400 includes a vertical structure used as a support for inspection of the formed mechanical part utilizing the coordinate-measuring machine 124. For instance and without limitation, the at least a pillar 400 may include fixture adapter interfaces providing potential support and fixturing location for a variety of formed mechanical parts.

Referring now to FIGS. 5A-C, an embodiment of the fixture adapter 140 being functionally installed into the at least a pillar 400 of the fixturing system 128 is illustrated. The at least a pillar 400 includes a female coupler 500. Female coupler 500, as described herein, is a unique shape extruded into the top face of the at least a pillar 400. The unique shape extruded into the at least a pillar 400 matches the unique shape of the male coupler 300 extracted from fixture adapter 140 to enable functional installation. Male coupler 300 is inserted into the female coupler 500, as illustrated in FIG. 5A. The male coupler 300 can only be inserted into the female coupler 500 in a single orientation. FIG. 5B illustrates the fixture adapter 140 functionally installed to the at least a pillar 400, wherein male coupler 300 is functionally installed into female coupler 500. The fixture adapter 140 will lock the proper orientation of connection to the at least a pillar 400 with a clockwise rotation by the automated operator. FIG. 5C illustrates an embodiment of the final locked orientation of the fixture adapter 140 functionally installed in the at least a pillar 400 of the fixturing system 128.

Figure 6A:
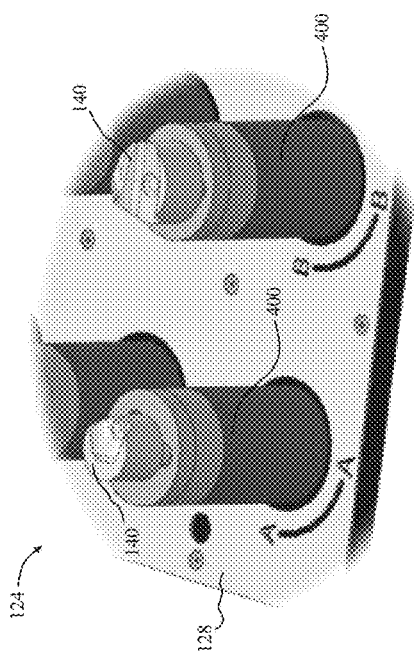
FIG. 6A-B are computer renderings of an embodiment of functional installation of a formed mechanical part and a fixture adapter.
Figure 6B:
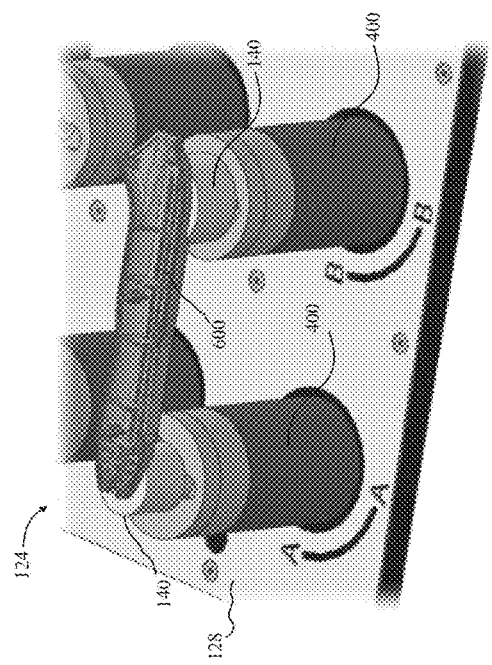

Referring now to FIGS. 6A-B, an embodiment of fixturing system 128 incorporated in coordinate-measuring machine 124 is illustrated. Fixturing system 128 includes the at least a pillar 400, wherein the at least a pillar 400 has fixture adapter 140 functionally installed. FIG. 6A illustrates the fixturing system 128 including the at least a pillar 400 and the fixture adapter 140. FIG. 6B illustrates the fixturing system, wherein the fixture adapter 140 is functionally installed to the at least a pillar 400. Formed mechanical part 600 is attached to fixture adapter 140. Formed mechanical part 600, as described herein, is any mechanical part datum manufactured and/or machined utilizing additive manufacturing, subtractive manufacturing, injection molding, and/or any combination thereof. Attachment is performed utilizing an adhesive element in the at least a pocket 304 of the fixture adapter 140. The adhesive element may include any adhesive element as described throughout the entirety of this disclosure. The fixturing system 128, including the formed mechanical part 600 attached to the fixture adapter 140 functionally installed to the at least a pillar 400, is prepared for inspection by the coordinate-measurement machine 124.

Figure 7:
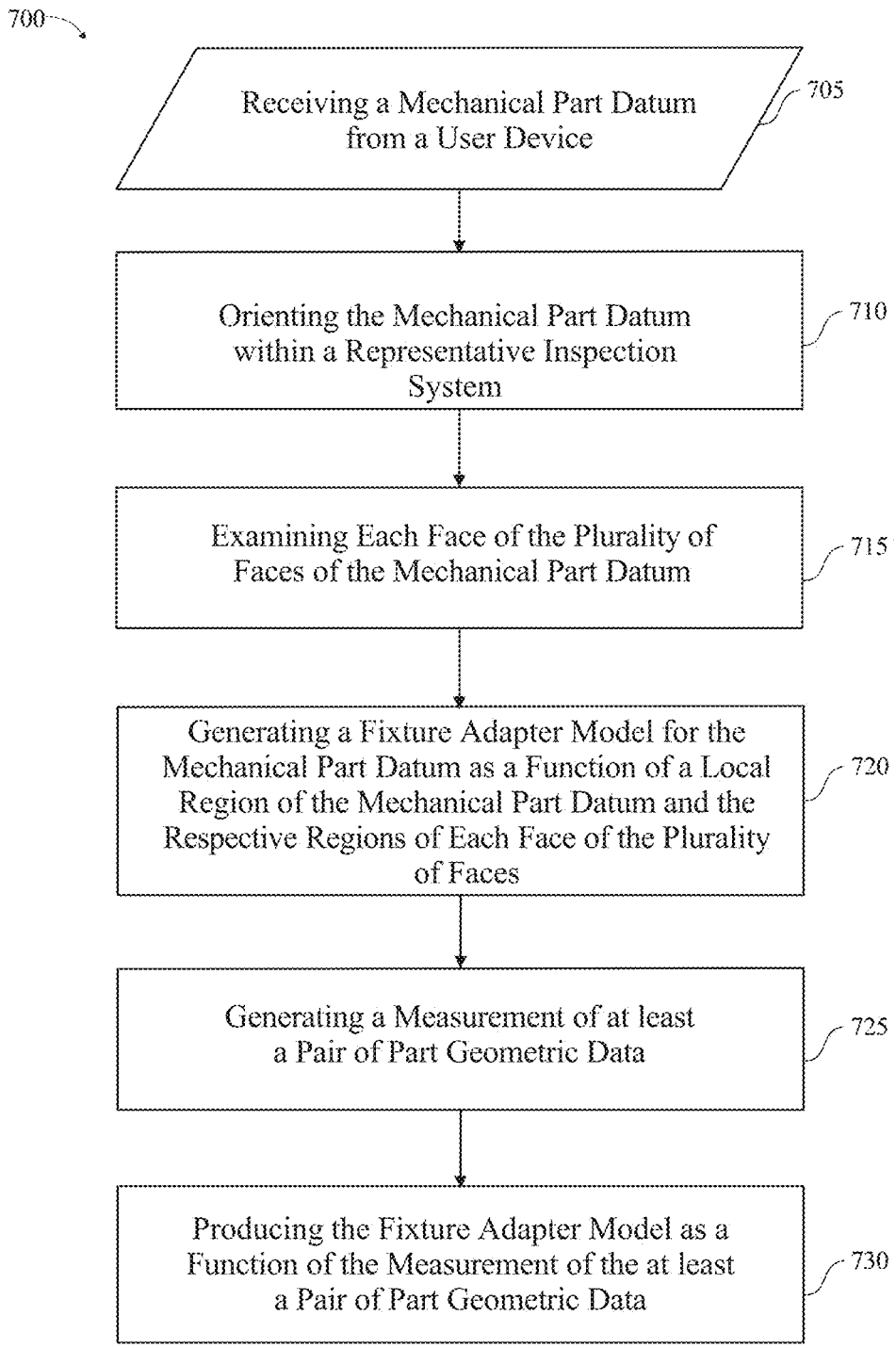
FIG. 7 is a process flow diagram illustrating an embodiment of a method of an in-line automated inspection of a mechanical part.

Referring now to FIG. 7, an embodiment of a method 700 for an in-line automated inspection of a mechanical part is illustrated. At step 705 system 100 receives, at computing device 104, a mechanical part datum 108 from a user device 112. Computing device 104 may include any computing device as described in the entirety of this disclosure. User device 112 may include any user device as described herein. Mechanical part datum 108 may be received by system 100 utilizing any of the network methodology as described herein. Mechanical part datum 108 may include any mechanical part datum as described herein. Mechanical part datum 108 may include, without limitation, a computer model of a part to be manufactured as described herein. A computer model may include any computer model as described herein. For example and without limitation, computer-aided design (CAD) software may include SOLIDWORKS® software and/or CATIA software (available from Dassault Systèmes SolidWorks Corp, Waltham, Mass.), AUTOCAD® software and/or Fusion 360 software (available from Autodesk, Inc., San Rafael, Calif.), PTC Creo software (available from PTC, Inc., Boston, Mass.), Siemens NX software (available from Siemens PLM Software, Plano, Tex.) and MICROSTATION® software (available from Bentley Systems, Inc., Exton, Pa.), and the like, as described above in reference to FIG. 1. The computer model may include any modeling type, such as, without limitation, a wireframe, solid model and/or any combination thereof, as described above in reference to FIG. 1. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like, as described above in reference to FIG. 1. For example and without limitation, the computer model further includes information about the geometry and/or other defining properties of the mechanical part's structure, such as total number of faces of mechanical part datum 108, total quantity of mechanical part datum 108 for manufacture, the material to which the mechanical part datum 108 is to be manufactured, manufacturing process to be used for the mechanical part datum 108, as described above in reference to FIG. 1.

Still referring to FIG. 7, at step 710, the automated operator at inspection module 116 orients the mechanical part datum 108 within a representative inspection system. Automated operator may include any automated operator, as described herein. The representative inspection system comprises a visual representation of the coordinate-measuring machine 124 and the fixturing system 128. The coordinate-measuring machine 124 includes any coordinate-measuring machine as described herein. Orientation may be displayed to an automated operator using an output graphical user interface 120. For example and without limitation, the coordinate-measuring machine 124 may further include the angle of the stylus, as described above in reference to FIG. 1. As a further example and without limitation, the coordinate-measuring system further includes the stylus can measure all six possible degrees of freedom, as described above in reference to FIG. 1. The fixturing system 128 includes any fixturing system as described herein. For example and without limitation, the fixturing system 128 may consist of an array of raised pillars, wherein the raised pillars include fixture adapter model interfaces providing potential support and fixturing location for an array of mechanical parts, as described above in reference to FIG. 1. Orienting the mechanical part datum within the representative inspection system is further configured to record the relative position of the mechanical part datum as a function of a specified datum on the fixturing system 128. The specified datum includes any specified datum as described above in reference to FIG. 1. For example and without limitation, the specified datum on the fixturing system 128 may include the top center point of a pillar determined to be pillar "A", as described above in reference to FIG. 1.

Continuing to refer to FIG. 7, at step 715 method 700 examines at the inspection module 116 operating on computing device 104 each face of the plurality of faces of the mechanical part datum 108. The face may include any face, as described herein. Stylus tip data may include any stylus tip data as described herein, such as data describing whether the tip of the stylus can touch a given point of the visual representation of the mechanical part in the representative inspection system without inadvertently touching any other points of the mechanical part. Examining each face of the plurality of faces of the mechanical part datum 108 further comprises dividing the face into regions as a function of stylus tip data. Dividing the face into regions as a function of stylus tip data is further configured to determine at least a touch region of the mechanical part datum as a function of stylus tip data and determining at least a non-touch region of the mechanical part datum as a function of stylus tip data. The at least a touch region may include any touch region as described herein, such as a point of the visual representation of the mechanical part in the representative inspection system where the stylus tip can touch without inadvertently touching another point of the visual representation of the mechanical part. The at least a non-touch region may include any non-touch region as described herein, such as a point of the visual representation of the mechanical part in the representative inspection system where the stylus tip cannot touch without inadvertently touching another point of the visual representation of the mechanical part.

With continued reference to FIG. 7, examining each face of the plurality of faces of the mechanical part datum by inspection module 116 operating on computing device 104 further comprises sampling each touch region of the plurality of touch regions of the mechanical part datum. Sampling may include any sampling as described herein. Sampling each touch region of the plurality of touch regions is further configured to determine the distance from each touch region of the plurality of touch regions to the nearest at least a non-touch region. Persons skilled in the art, upon reviewing the entirety of this disclosure, will be aware of various possible variations of sampling that may be used to determine the distance from each touch region of the plurality of touch regions to the nearest at least a non-touch region.

Still referring to FIG. 7, examining each face of the plurality of faces of the mechanical part datum 108 by inspection module 116 operating on computing device 104 further comprises receiving, from the automated operator by the graphical user interface 120, at least a manufacturing goal. At least a manufacturing goal may include any manufacturing goal, as described herein. For an example and without limitation, a manufacturing goal may include finding three points in which their surface normal point upward with a specified angle, wherein the three points can be used to define a plane, as described above in reference to FIG. 1. For a further example and without limitation, a manufacturing goal may include finding the point with the largest positive x-axis position and has a normal closest to the positive x-axis, as described in further detail above in reference to FIG. 1. As another non-limiting example, a manufacturing goal may include staying a specific distance away from non-reachable regions, as described above in reference to FIG. 1. For instance, and without limitation, graphical user interface 120 may be provided to user with a set of sliders or other user inputs permitting a user to indicate relative and/or absolute importance of each variable to the user, as described above in further detail in reference to FIG. 1.

Continuing to refer to FIG. 7, examining each face of the plurality of faces of the mechanical part datum 108 by inspection module 116 operating on computing device 104 further comprises generating a loss function as a function of the distance from each touch region of the plurality of touch regions to the nearest non-touch region and the at least a manufacturing goal and minimizing the loss function. Loss function may include any of the loss function as described above in further detail in reference to FIG. 1. Generating a loss function may include generating a loss function utilizing any of the methodologies as described above in reference to FIGS. 1-6. A manufacturing goal may include any manufacturing goal as described above. For example and without limitation, inspection module 116 may compare one or more alignment datum options to a loss function representing an optimal combination of the distance from each touch region of the plurality of touch regions to the nearest non-touch region and the at least a manufacturing goal. Minimizing a loss function may be done utilizing any of the methodologies as described above in reference to FIGS. 1-6. Loss function analysis algorithms may iterate to gradually converge towards a minimum where further tweaks to the parameters produce little or zero changes in the loss or convergence by optimizing weights utilized by machine learning algorithms.

Still referring to FIG. 7, examining each face of the plurality of faces of the mechanical part datum 108 by inspection module 116 operating on computing device 104 further comprises selecting at least an alignment datum as a function of minimizing the loss function. Alignment datum may include any alignment datum as described herein. Alignment datum may include textual data, numeric data, electronic file data and/or any combination thereof, as described above in further detail in reference to FIG. 1. For example and without limitation, the alignment datum may include the distance from each touch region of the plurality of touch regions to the nearest at least a non-touch region, as described in further detail above in reference to FIG. 1. Alignment datum may include, as a further example and without limitation, at least a manufacturing goal, as described above in further detail in reference to FIG. 1. Selecting at least an alignment datum as a function of minimizing the loss function is configured to store the at least an alignment datum in inspection database 132, as described above in more detail in reference to FIGS. 1-2. Inspection database 132 may include any database as described above in reference to FIGS. 1-2. Datasets contained within inspection database 132 may be categorized and/or organized utilizing any of the methodologies as described above in reference to FIGS. 1-2. Storing the at least an alignment datum in inspection database 132 may include any method and/or combination of methods of storing as described above in reference to FIGS. 1-6.

With continued reference to FIG. 7, at step 720 method 700 generates at inspection module 116 a fixture adapter module 136 for the mechanical part datum 108 The fixture adapter model 136 is generated as a function of the local region of the mechanical part datum 108. The local region of the mechanical part datum 108 is determined by the automated operator. The local region of mechanical part datum 108 may include any local region as described above in reference to FIG. 1. The fixture adapter model 136 may include any fixture adapter model as described above in further detail in reference to FIGS. 1-6. For example and without limitation, the fixture adapter model 136 may be configured individually for each mechanical part datum, as described above in further detail in reference to FIG. 1. For another example and without limitation, generating a fixture adapter model 136 may include incorporating the geometry of the mechanical part datum, as described in further detail above.

Referring again to FIG. 7, generating the fixture adapter model 136 at inspection module 116 further comprises positioning a male coupler in the fixture adapter model 136. A male coupler may include any male coupler as described above in reference to FIGS. 1-6. The male coupler of the fixture adapter model 136 is configured to functionally install to the female coupler of the fixturing system 128. Functionally install may include any functional installation as described above in further detail in reference to FIGS. 1-6. Generating the fixture adapter model 136 is further configured to create at least a window in the fixture adapter model 136. The at least a window may include any window as described in further detail above in reference to FIGS. 1-6. For instance, creating at least a window in the fixture adapter model 136 may include, without limitation, removing small volumes of material from the computer representation of the fixture adapter model 136, as described above in further detail in reference to FIGS. 1-6. Generating the fixture adapter model 136 is further configured to position at least a pocket in the fixture adapter model 136. The at least a pocket, as described herein, may include any pocket as described above in reference to FIGS. 1-6. The at least a pocket is configured and designed to contain an adhesive element. The adhesive element may include any adhesive element as described above in reference to FIGS. 1-6. Positioning at least a pocket may include automatic positioning, interactive positioning by the automated operator, or any combination thereof.

With continued reference to FIG. 7, generating the fixture adapter model further comprises inflating the mechanical part datum 108 by a dimensional factor. The mechanical part datum 108 may include any mechanical part datum as described herein. The dimensional factor may include any dimensional factor as described above in reference to FIGS. 1-6. For instance, the dimensional factor may include an accommodation of any warp and/or dimensional error of the formed mechanical part or the machined fixture adapter, as described above in further detail in reference to FIGS. 1-6. Generating the fixture adapter model 136 is further configured to subtract the mechanical part datum 108 from the fixture adapter model 136. Subtracting may include any step and/or combination of steps of subtracting, as described above in reference to FIGS. 1-6. As an example and without limitation, subtracting may include hiding the mechanical part datum 128 to allow only fixture adapter model 136 to be distinguishable, as described in further detail above in reference to FIGS. 1-6.

Continuing to refer to FIG. 7, generating the fixture adapter model 136 by inspection module 116 operating on computing device 104 further includes storing the fixture adapter data in the inspection database 132. Storing the fixture adapter data may include any steps and/or combination of steps of storing as described above in reference to FIGS. 1-2. The fixture adapter data may include any fixture adapter data as described above in reference to FIGS. 1-2. Fixture adapter data, as described herein, is any data associated with generating the fixture adapter model, wherein the data may include textual data, numeric data, electronic file data and/or any combination thereof. For example and without limitation, fixture adapter data may include the computer aided design of the fixture adapter model, as described above in reference to FIGS. 1-2. As a further example and without limitation, fixture adapter data may include the dimensional factor used to inflate the mechanical part datum, as described above in further detail in reference to FIGS. 1-2.

Referring still to FIG. 7, at step 725 method 700 further comprises generating, at inspection module 116 operating on computing device 104, a measurement of at least a pair of part geometric data. Generating a measurement is designed and configured to include selecting, by the automated operator, the at least a pair of part geometric data as a function of the at least an alignment datum. The at least a pair of part geometric data is any pair of part geometric data as described above in reference to FIG. 1. Part geometric data, as described herein, may include any part geometric data as described above in reference to FIGS. 1-6. For example and without limitation, the part geometric data may include the face of the mechanical part datum 108, as described above in further detail in reference to FIG. 1. As a further example and without limitation, part geometric data may further include a mechanical part datum 108 edge, as described above in further detail in reference to FIG. 1. As another non-limiting example, part geometric data may include a vertex of the mechanical part datum 108, as described above in further detail in reference to FIG. 1. Selection may include any step and/or combination of steps of selection as described above in further detail in reference to FIGS. 1-6. Generating a measurement is further designed and configured to include displaying, to the automated operator on the graphical user interface 120, the measurement of the at least a pair of part geometric data. The measurement of the at least a pair of part geometric data is any measurement of the at least a pair of part geometric data as described above in reference to FIG. 1. For example and without limitation, measurement may include meter, centimeter, millimeter, micrometer, nanometer, feet, inches, yards, picas, and the like, as described in further detail above in reference to FIG. 1.

Continuing to refer to FIG. 7, displaying the measurement of the at least a pair of part geometric data is further configured to include verifying, by the automated operator on the graphical user interface 120, the measurements of the at least a pair of part geometric data. Verification is any step and/or combination of steps of verification as described above in reference to FIGS. 1-6. For example and without limitation, verification may include an indication of selection by the automated operator utilizing the graphical user interface 120, as described above in further detail in reference to FIGS. 1-6. For instance and without limitation, indication of selection may include sliders or other user inputs permitting a user to indicate relative and/or absolute importance of each variable to the user, as described in further detail above. As a further example and without limitation, indication of selection may include an interaction with the graphical user interface 120 indicating the acceptance of the measurements of the at least a pair of part geometric data, as described above in further detail in reference to FIGS. 1-6. Displaying the measurement of the at least a pair of part geometric data is further configured to store the verified measurement data in the inspection database 132. Storing the verified measurement data may include any step and/or combination of steps of storing as described above in further detail in reference to FIGS. 1-2. Verified measurement data is any verified measurement data as described above in reference to FIGS. 1-6. For example and without limitation, verified measurement data may include the measurements of the at least a pair of part geometric data as verified by the automated operator on graphical user interface 120, as described in further detail above in reference to FIGS. 1-6.

With continued reference to FIG. 7, at step 730 method 700 is further configured to produce the fixture adapter 140 as a function of the measurement of the at least a pair of part geometric data. Production may include steps and/or combination of steps of producing the fixture adapter 140 as described above in reference to FIG. 1. For example and without limitation, production may include any step and/or combination of steps of any additive manufacturing processes, as described above in further detail in reference to FIG. 1. As a further example and without limitation, production may include any step and/or combination of steps of any subtractive manufacturing processes, as described in further detail in reference to FIG. 1. As another non-limiting example, production may include any step and/or combination of steps of any injection molding processes, as described above in reference to FIG. 1. Producing the fixture adapter 140 may include any materials compatible for any manufacturing processes, as described above in reference to FIGS. 1-6.

Figure 8:
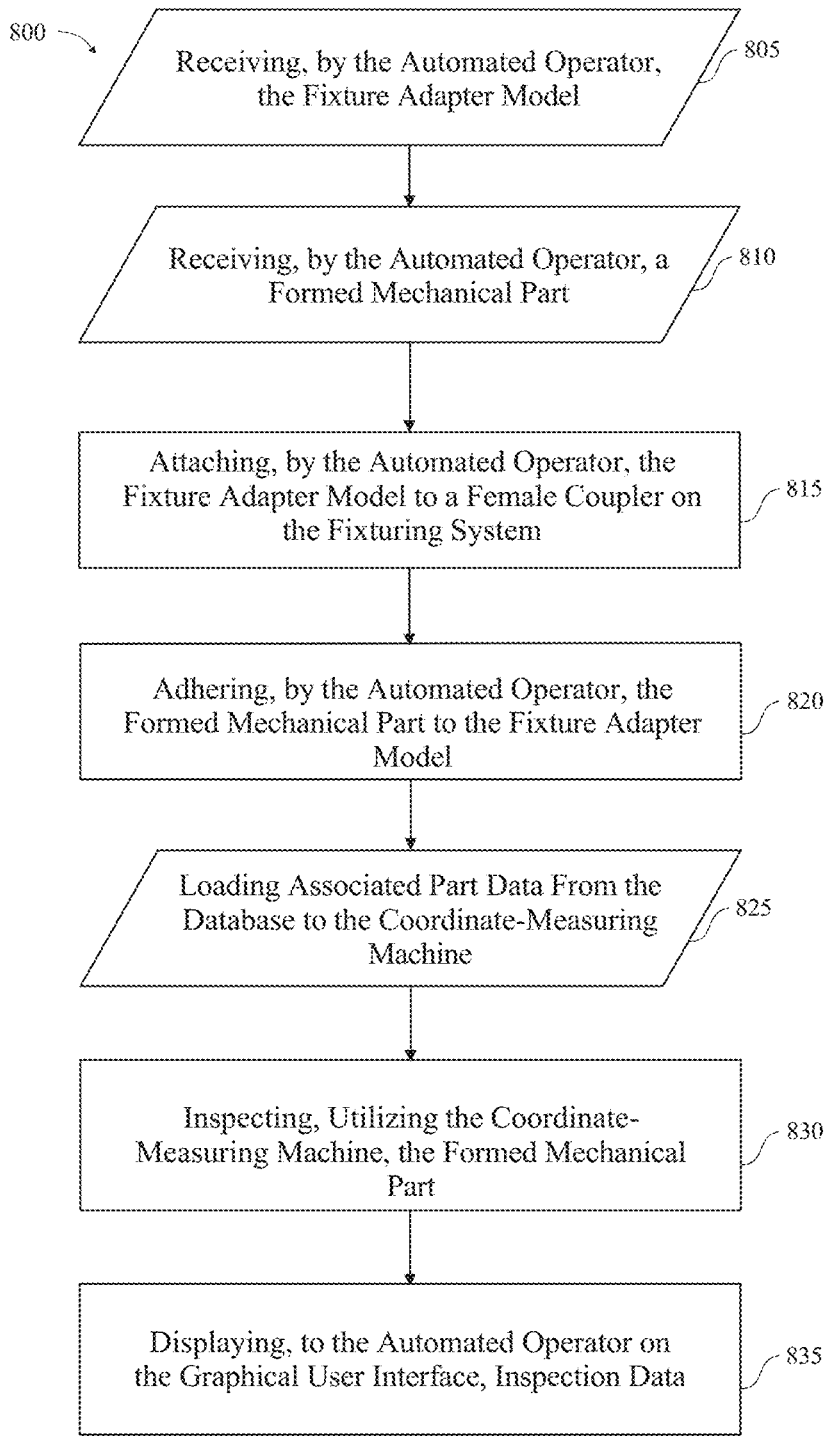
FIG. 8 is a process flow diagram illustrating an embodiment of a method of an in-line automated inspection of a mechanical part.

Referring now to FIG. 8, an embodiment of method 800 for an in-line automated inspection of a mechanical part to further include is illustrated, wherein method 700 is further configured to include method 800. At step 805, method 800 comprises receiving, by the automated operator, the fixture adapter 140. The fixture adapter may include any fixture adapter described above in reference to FIG. 1. For example and without limitation, the fixture adapter may include the produced fixture adapter model 136, such as a fixture adapter model 136 produced by additive manufacturing processes or a fixture adapter model 136 produced by subtractive manufacturing processes. The automated operator is any automated operator as described above in reference to FIG.

Still referring to FIG. 8, at step 810, method 800 further comprises receiving, by the automated operator, a formed mechanical part 600. The formed mechanical part 600 may include any formed mechanical part, as described above in reference to FIG. 6. For example and without limitation, the formed mechanical part 600 may include the mechanical part datum 108 manufactured utilizing any step and/or combination of steps of subtractive manufacturing processes. As a further example and without limitation, the formed mechanical part 600 may include the mechanical part datum 108 manufactured utilizing any step and/or combination of steps of injection molding processes. As a further non-limiting example, the formed mechanical part 600 may include the mechanical part datum 108 manufactured utilizing any step and/or combination of steps of subtractive manufacturing processes.

Continuing to refer to FIG. 8, at step 815, method 800 further comprises attaching, by the automated operator, the fixture adapter to a female coupler on the fixturing system. The fixture adapter 140 is any fixture adapter as described herein. The fixture adapter 140, as described above in reference to FIG. 1, includes male coupler 300. Male coupler 300 is any male coupler as described above in reference to FIGS. 1-6. The fixturing system 128, as described above in reference to FIGS. 1-6, includes a female coupler 500 extending from the top of pillar 400. The female coupler 500 is any female coupler as described above in reference to FIGS. 1-6. The male coupler 300 extending from fixture adapter 140 uniquely fits inside the female coupler 500 of fixturing system 128 to enable fixture adapter 140 and fixturing system 128 to functionally install. Functionally install is any step and/or combination of steps of functional installation as described above in reference to FIGS. 1-6. With fixture adapter 140 functionally installed into the fixturing system 128, the fixture is designed to maintain a still position to hold the formed mechanical part during inspection utilizing the coordinate-measuring machine 124. The male coupler 300 can only be inserted into the female coupler 500 in a single orientation. For instance and without limitation, the fixture adapter 140 is functionally installed to the at least a pillar 400, wherein male coupler 300 is functionally installed into female coupler 500 and the fixture adapter 140 will lock the proper orientation of connection to the at least a pillar 400 with a clockwise rotation by the automated operator.

With continued reference to FIG. 8, at step 820, method 800 further comprises adhering, by the automated operator, the formed mechanical part 600 to the fixture adapter 140. Fixture adapter 140, as described above in reference to FIG. 1-6, includes at least a pocket 304, wherein the at least a pocket 304 is positioned by the automated operator and/or automatically. Adhering the formed mechanical part 600 to the fixture adapter 140 further includes embedding an adhesive element into each pocket 304 of the plurality of pockets 304 of the fixture adapter model 136. The adhesive element is any adhesive element as described above in reference to FIGS. 1-6. For example and without limitation, the adhesive element may include resins, hot melt, contact spray, acrylic, anaerobic adhesive, conductive adhesive, epoxy adhesives, pressure adhesives, and/or any combination thereof. Adhering may include any adhering as described above in reference to FIGS. 1-6. For example and without limitation, adhering may include applying pressure to the formed mechanical part 600, wherein the formed mechanical part 600 is in the fixture adapter model 136 with each pocket 304 of the plurality of pockets 304 containing a resin adhesive.

Referring still to FIG. 8, at step 825, method 800 further comprises loading associated part data from inspection database 132 to the coordinate-measuring machine 124. Associated part data is configured to include fixture adapter data, alignment datum, verified measurement data, and any combination thereof. Fixture adapter data is any fixture adapter data as described above in reference to FIGS. 1-2. Alignment datum is any alignment datum as described above in reference to FIGS. 1-2. Verified measurement data is any verified measurement data as described above in reference to FIGS. 1-2. Inspection database 132 is any inspection database as described above in reference to FIGS. 1-2. Loading associated part data, as described herein, is obtaining the associated part data from inspection database 132 and receiving the associated part data by coordinate-measuring machine 124. Coordinate-measuring machine 124 may include any coordinate-measuring machine as described above in further detail in reference to FIG. 1.

Still referring to FIG. 8, at step 830, method 800 may further comprise inspecting the formed mechanical part 600 utilizing the coordinate-measuring machine 124. Inspecting the formed mechanical part 600, as described herein, is measuring the geometry of the formed mechanical part 600 by sensing discrete points on the surface of formed mechanical part 600 with a probe. The probe may include any probe as described above in reference to FIG. 1. The coordinate-measuring machine 124 allows probe movement along a Cartesian coordinate system, wherein the probe has movement along the x-axis, y-axis, and z-axis. For instance, and without limitation, inspecting the formed mechanical part 600 may include each Cartesian coordinate having a sensor to monitor the position of the probe on each axis. The coordinate-measuring machine 124 continuously samples the three sensors when the probe contacts a location on the formed mechanical part 600 until all locations of the formed mechanical part 600 are sampled, wherein sampling further includes measuring the location of one point on the surface of the formed mechanical part 600.

With continued reference to FIG. 8, at step 835, method 800 further comprises displaying, to the automated operator on the graphical user interface 120, the inspection data. Inspection data, as described herein, is any data associated with inspecting, utilizing the coordinate-measuring machine 124, the formed mechanical part and displaying, to the automated operator on a graphical user interface 120, the inspection data. For example and without limitation, the verified inspection data may include data describing the inspection data collected by inspecting the formed mechanical part utilizing the coordinate-measuring machine 124. As a further example and without limitation, verified inspection data may include data describing the verification of the inspection data by the automated operator utilizing the graphical user interface 120. Persons skilled in the art, upon reviewing the entirety of this disclosure, will be aware of data which may be suitable for use in verified inspection data consistently with this disclosure.

Continuing to refer to FIG. 8, displaying the inspection data further comprises verifying, by the automated operator on the graphical user interface 120, the inspection data. Verification is any step and/or combination of steps of verification as described above in reference to FIG. 1. For example and without limitation, verification may include sliders or other user inputs permitting a user to indicate relative and/or absolute importance of each variable to the user. As a further example and without limitation, verification may include an interaction with the graphical user interface 120 indicating the acceptance of the inspection of the formed mechanical part 600, wherein an interaction may include selecting a button signifying 'YES', selecting the inspection data directly. Persons skilled in the art, upon reviewing the entirety of this disclosure, will be aware of various means of verification that may be included as verifying inspection data. Displaying the inspection data to the automated operator on graphical user interface 120 further comprises storing the verified inspection data in the inspection database 132. Storing the verified inspection data may include any step and/or combination of steps of storing as described herein. Verified inspection data, as described herein, is any data associated with inspecting the formed mechanical part 600 by the coordinate-measuring machine 124, wherein the data may include textual data, numeric data, electronic file data and/or any combination thereof. Verified inspection data may include, for example and without limitation, the measurements gathered during inspection utilizing the coordinate-measuring machine 124 as verified by the automated operator on graphical user interface 120. Persons skilled in the art, upon reviewing the entirety of this disclosure, will be aware of data that may be included as verified inspection data.

Still referring to FIG. 8, displaying the inspection data further comprises displaying the verified inspection data to the user device 112. The verified inspection data is any verified inspection data as described above. The user device 112 is any user device as described above in reference to FIG. 1. Displaying may include any step and/or combination of steps of displaying as described herein. For example and without limitation, displaying may include informing the user of the verified inspection data by utilizing the user device 112. Persons skilled in the art, upon reviewing the entirety of this disclosure, will be aware of means of displaying that may be included as displaying the verified inspection data to the user device 112.

In an embodiment, the method may further include inspecting the formed mechanical part utilizing a probing strategy of the plurality of probing strategies. Probing strategy includes a mean of inspecting the formed mechanical part utilizing the coordinate-measuring machine by specifying probe paths, vectors, forces, methods, or any other parameter suitable as a probing parameter. The probing strategy may be generated by the computing device, but alternative may be generated by any other computing device as described in the entirety of this disclosure. The probing strategy, for example and without limitation may be used to control quantity, such as by validating the formed mechanical part matches the mechanical part datum within a margin of error. As a further example and without limitation, the probing strategy may be used to verify that features of the mechanical part, such as holes, curvature, grooves, and the like, are present, are in the correct location and the correct orientation. As a further example and without limitation, the probing strategy may determine the deviation of the formed mechanical part from the mechanical part datum, such as a deviation of holes, deviation of curvature, deviation of protrusions, and the like. The probing strategy may be generated as the fixture adapter model is generated, after the fixture adapter model has been generated, after a machining or other manufacturing process has been completed, or generated at any other suitable time. Persons skilled in the art, upon reviewing the entirety of this disclosure, will be aware of means of inspecting the formed mechanical part that may be included as probing strategies.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
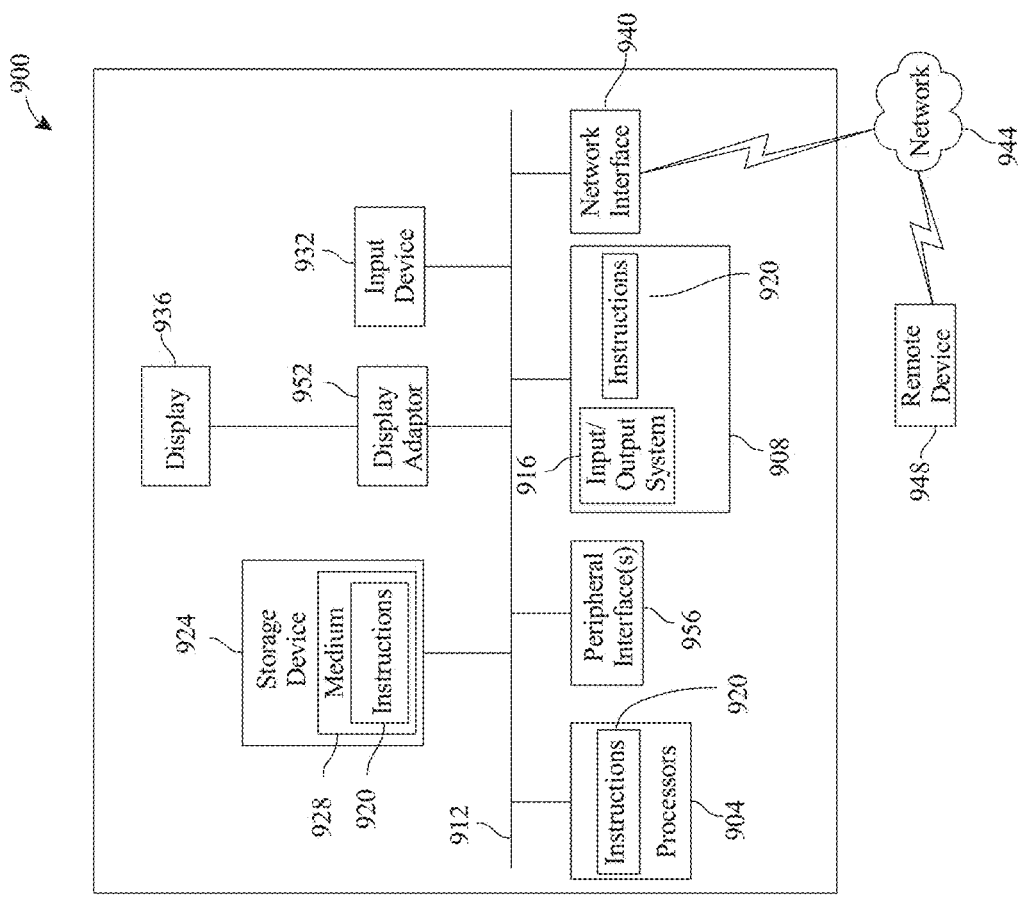
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for in-line automated inspection of a mechanical part, the method comprising:
   receiving, by a computing device, a mechanical part datum from a user device, wherein the mechanical part datum comprises a plurality of faces;
   recording, by an inspection module operating on the computing device, a relative position of the mechanical part datum as a function of a specified datum on a visual representation of a fixturing system;
   examining, at the inspection module, each face of the plurality of faces of the mechanical part datum, wherein examining each face of the plurality of faces of the mechanical part datum comprises determining at least a touch region of each face of the plurality of faces;
   generating, at the inspection module, a fixture adapter model for the mechanical part datum as a function of a local region of the mechanical part datum and the at least a touch region of each face of the plurality of faces;
   generating, at the inspection module, a measurement of at least a pair of part geometric data, wherein generating a measurement comprises:
      selecting, by an automated operator, the at least a pair of part geometric data as a function of at least an alignment datum; and
      displaying, to the automated operator, the measurement of the at least a pair of part geometric data; and
      receiving, from the automated operator, a verification of the measurement of the at least a pair of part geometric data.

2. The method of claim 1, wherein examining each face of the plurality of faces of the mechanical part datum further comprises determining at least a non-touch region of the mechanical part datum.

3. The method of claim 2, wherein examining each face of the plurality of faces of the mechanical part datum comprises sampling the at least a touch region of the mechanical part datum.

4. The method of claim 3, wherein sampling the at least a touch region further comprises determining the distance from each touch region of the at least a touch region to a nearest non-touch region of the at least a non-touch region.

5. The method of claim 2, wherein examining each face of the plurality of faces of the mechanical part datum comprises:
   receiving, from the automated operator, at least a manufacturing goal; and
   selecting the at least an alignment datum as a function of the at least a manufacturing goal, the at least a touch region and the at least a non-touch region.

6. The method of claim 5, wherein selecting the at least an alignment datum as a function of the at least a manufacturing goal, the at least a touch region and the at least a non-touch region further comprises storing the at least an alignment datum in a database.

7. The method of claim 1, wherein the method further comprises receiving, by the automated operator, the local region of the mechanical part datum.

8. The method of claim 1, wherein generating the fixture adapter model further includes creating at least a window in the fixture adapter model as a function of the mechanical part datum.

9. The method of claim 1, wherein generating the fixture adapter model further includes subtracting the mechanical part datum from the fixture adapter model.

10. The method of claim 1, wherein the method further comprises storing the fixture adapter model and the measurement of the at least a pair of geometric data as a function of receiving the verification of the measurement of the at least a pair of part geometric data.

11. A system of an in-line automated inspection of a mechanical part, the system is designed and configured to:
   receive, at a computing device, a mechanical part datum from a user device, wherein the mechanical part datum comprises a plurality of faces;
   record, at an inspection module operating on the computing device, a relative position of the mechanical part datum as a function of a specified datum on a visual representation of a fixturing system;
   examine, at the inspection module, each face of the plurality of faces of the mechanical part datum, wherein examining each face of the plurality of faces of the mechanical part datum comprises determining at least a touch region of each face of the plurality of faces;

generate, at the inspection module, a fixture adapter model for the mechanical part datum as a function of a local region of the mechanical part datum;

generate, at the inspection module, a measurement of at least a pair of part geometric data, wherein generating a measurement is designed and configured to:

select, by an automated operator, the at least a pair of part geometric data as a function of at least an alignment datum; and display, to the automated operator, the measurement of the at least a pair of part geometric data; and receive, from the automated operator, a verification of the measurement of the at least a pair of part geometric data.

12. The system of claim 11, wherein examining each face of the plurality of faces of the mechanical part datum further comprises determining at least a non-touch region of the mechanical part datum.

13. The system of claim 12, wherein examining each face of the plurality of faces of the mechanical part datum comprises sampling the at least a touch region of the mechanical part datum.

14. The system of claim 13, wherein sampling the at least a touch region further comprises determining the distance from each touch region of the at least a touch region to a nearest non-touch region of the at least a non-touch region.

15. The system of claim 12, wherein examining each face of the plurality of faces of the mechanical part datum is configured to:

receive, from the automated operator, at least a manufacturing goal; and select the at least an alignment datum as a function of the at least a manufacturing goal, the at least a touch region and the at least a non-touch region.

16. The system of claim 15, wherein selecting the at least an alignment datum as a function of the at least a manufacturing goal, the at least a touch region and the at least a non-touch region further comprises storing the at least an alignment datum in a database.

17. The system of claim 11, wherein the system is further configured to receive, by the automated operator, the local region of the mechanical part datum.

18. The system of claim 11, wherein generating the fixture adapter model is further configured to create at least a window in the fixture adapter model as a function of the mechanical part datum.

19. The system of claim 11, wherein generating the fixture adapter model is further configured to subtract the mechanical part datum from the fixture adapter model.

20. The system of claim 11, wherein the system is further configured to store the fixture adapter model and the measurement of the at least a pair of geometric data as a function of receiving the verification of the measurement of the at least a pair of part geometric data.

* * * * *